US011971218B1

(12) United States Patent
Feng et al.

(10) Patent No.: US 11,971,218 B1
(45) Date of Patent: Apr. 30, 2024

(54) AUTOMATIC CHARGING APPARATUS FOR A FURNACE

(71) Applicant: ZHEJIANG HAILIANG CO., LTD., Zhejiang (CN)

(72) Inventors: Huanfeng Feng, Shaoxing (CN); Gangfeng Sun, Shaoxing (CN); Yunlong Wang, Shaoxing (CN)

(73) Assignee: ZHEJIANG HAILIANG CO., LTD., Shaoxing (CN)

( * ) Notice: Subject to any disclaimer, the term of this patent is extended or adjusted under 35 U.S.C. 154(b) by 0 days.

(21) Appl. No.: 18/241,380

(22) Filed: Sep. 1, 2023

(51) Int. Cl.
*F27D 3/10* (2006.01)
*F27D 3/04* (2006.01)
*F27D 3/00* (2006.01)

(52) U.S. Cl.
CPC ................. *F27D 3/10* (2013.01); *F27D 3/04* (2013.01); *F27D 2003/0092* (2013.01)

(58) Field of Classification Search
CPC ..................................... F27D 3/04; F27D 3/10
USPC .................................................. 414/187, 198
See application file for complete search history.

(56) References Cited

U.S. PATENT DOCUMENTS 3,578,296 A 5/1971 Boucraut et al.
4,714,031 A * 12/1987 Healy .................... F23M 11/02 110/109
5,151,000 A * 9/1992 Geraghty ............... F23M 11/02 110/282
5,453,164 A * 9/1995 Breu ........................ C10B 49/04 202/136
6,389,054 B1 * 5/2002 Stercho ..................... F27D 3/00 373/79
7,497,985 B2 * 3/2009 Fuchs ................... F27D 13/002 414/160
2014/0138216 A1 5/2014 Rummler

FOREIGN PATENT DOCUMENTS

CA 2222401 A1 5/1999
CN 108642237 A 10/2018

OTHER PUBLICATIONS

Jan. 30, 2024 Extended European Search Report issued in European Application No. 23194933.0.

* cited by examiner

*Primary Examiner* — Jonathan Snelting
(74) *Attorney, Agent, or Firm* — Oliff PLC

(57) ABSTRACT

An automatic charging apparatus for a furnace, including: a hopper provided with an inlet and an outlet opening; a buffer bin in which a buffer channel is provided, one end of the buffer channel including a discharge port communicating with the outlet opening, the other end being in communication with a feeding inlet of the furnace; a pushing mechanism configured to push feedstock in the buffer channel sequentially into the feeding inlet of the furnace, the pushing mechanism including a drive and a pushing element, the drive driving the pushing element to perform a reciprocating movement in the buffer channel so the feedstock in the buffer channel is sequentially pushed into the feeding inlet via the reciprocating movement of the pushing element. The solution can implement automatic charging of feedstock in the furnace, reduce labor intensity of operators, and realize accurate control of charging amount of the feedstock.

8 Claims, 14 Drawing Sheets

AUTOMATIC CHARGING APPARATUS FOR A FURNACE

FIELD

The subject matter described herein relates to the field of copper production, and more particularly relates to an automatic charging apparatus for a furnace.

BACKGROUND

In conventional production process of copper and copper alloy tubes, sheets, and strips with a horizontal continuous casting furnace, it is always needed to charge an appropriate amount of zinc feedstock to condition zinc content of the molten copper in the furnace so as to ensure product quality of continuous casting. In the prior art, a certain amount of zinc feedstock is first weighed and then manually charged into the furnace. During this process, an operator has to endure the high temperature inside the furnace; in addition, charging of the zinc feedstock is also labor intensive. Therefore, the conventional zinc feedstock charging manner is unfriendly to operators.

SUMMARY

To overcome the above and other drawbacks of manually charging feedstock into a furnace in conventional technologies, embodiments of the disclosure provide an automatic charging apparatus for a furnace, which can implement automatic charging of feedstock in the furnace, thereby reducing labor intensity of operators and realizing accurate control the amount of feedstock charged.

The disclosure adopts a technical solution below:

An automatic charging apparatus for a furnace comprises:

a hopper provided with an inlet opening and an outlet opening;

a buffer bin in which a buffer channel is provided, one end of the buffer channel being provided with a discharge port communicating with the outlet opening, another end of the buffer channel being in communication with a feeding inlet of a furnace;

a pushing mechanism configured to push feedstock in the buffer channel sequentially into the feeding inlet of the furnace, the pushing mechanism comprising a drive and a pushing element, the drive driving the pushing element to perform a reciprocating movement in the buffer channel such that the feedstock in the buffer channel is sequentially pushed into the feeding inlet via the reciprocating movement of the pushing element.

In the technical solution above, the feedstock to be charged into the furnace may be first inputted into the hopper via the inlet opening. The feedstock in the hopper may sequentially enter the buffer channel via the outlet opening, and then the pushing mechanism sequentially pushes the feedstock in the buffer channel into the feeding inlet; each reciprocal movement of the pushing element allows for pushing a certain amount of feedstock; by controlling the number of times of the reciprocal movement of the pushing element, the amount of feedstock to be charged may be accurately controlled. Since the mass of each piece of feedstock is substantially consistent, this solution may realize accurate control of the amount of the feedstock charged. In addition, by controlling the speed of reciprocal movement of the pushing element, the charging speed of the feedstock may be controlled such that the feedstock may be charged into the furnace at a constant speed or at a set timing and quantity required by a process.

Preferably, a storage channel is inclinedly provided in the buffer bin, the storage channel being disposed above the buffer channel, an upper end of the storage channel being in communication with the outlet opening, a lower end of the storage channel being in communication with the buffer channel.

In the technical solution above, a certain amount of feedstock may be stored in the storage channel so as to increase the amount of pre-stored feedstock.

Preferably, a plurality of the storage channels are provided, the plurality of storage channels being successively arranged in a vertical direction; and in two neighboring storage channels, the lower end of the storage channel above is in communication with the upper end of the storage channel below. This technical solution may further increase the amount of pre-stored feedstock.

Preferably, a cavity of the buffer bin is in communication with a cavity of the furnace; a plurality of through holes are provided in an inner wall of the buffer channel and/or an inner wall of the storage channel such that high-temperature gas in the furnace accesses the buffer channel and/or the storage channel in the buffer bin.

In the technical solution above, the high-temperature gas in the furnace may access the buffer bin and then enter the buffer channel and the storage channels via the through holes, such that the high-temperature gas may preheat the feedstock in the buffer bin; in this way, heat of the high-temperature gas discharged from the inside of the furnace may be sufficiently recycled, which saves energy; in addition, preheating of the feedstock may reduce the melting time of the feedstock in the furnace, thereby enhancing production efficiency.

Preferably, a bottom surface of one end of the buffer channel proximal to the feeding inlet is provided with a limiting block, an inclined surface being provided on the limiting block, the inclined surface tilting from one side proximal to the feeding inlet toward one side distant from the feeding inlet such that the feedstock is pushed by the pushing element to move toward the feeding inlet along the inclined surface and cross over the limiting block into the feeding inlet.

In the technical solution above, when the pushing element extends out, it may push the feedstock in the buffer channel to cross over the inclined surface into the feeding inlet; the amount of the feedstock entering the feeding inlet is associated with an extended length of the pushing element; the remaining feedstock in the buffer channel, which has not been pushed into the feeding inlet yet, may be stopped by the limiting block from rushing into the feeding inlet due to inertance.

Preferably, the pushing element is disposed below the discharge port, the bottom surface of the buffer channel tilting from the side distant from the feeding inlet to the side proximal to the feeding inlet, a tilt angle of the bottom surface of the buffer channel being smaller than a tile angle of the inclined surface such that when the pushing element is retracted, the feedstock in the buffer channel is retained in the buffer channel.

In the technical solution above, the tilting arrangement of the bottom surface of the buffer channel from the side distant from the feeding inlet to the side proximal to the feeding inlet allows for the feedstock in the buffer channel to move toward the feeding inlet, such that when the pushing element is retracted, backward movement of the feedstock along with the pushing element may be avoided, such that the feedstock in the hopper or storage channels may smoothly fall into the buffer channel.

Preferably, the pushing element is disposed below the discharge port, the buffer channel comprising a forward tilting segment and backward tilting segment, the forward tilting segment being disposed at a side proximal to the pushing mechanism, the backward tilting segment being disposed at a side proximal to the feeding inlet, a bottom surface of the forward tilting segment tilting from a side distant from the feeding inlet to a side proximal to the feeding inlet, a bottom surface of the backward tilting segment tilting from a side proximal to the feeding inlet toward a side distant from the feeding inlet.

In the technical solution above, the tilting arrangement of the bottom surface of the forward tilting segment from the side distant from the feeding inlet to the side proximal to the feeding inlet allows for the feedstock in the forward tilting segment to move towards the feeding inlet, such that when the pushing element is retracted, backward movement of the feedstock may be prevented, and the feedstock in the hopper or the storage channel may smoothly fall into the buffer channel. The tilting arrangement of the bottom surface of the backward tilting segment from the side proximal to the feeding inlet toward the side distant from the feeding inlet may prevent the feedstock in the backward tilting segment, which has not been pushed into the feeding inlet yet, from rushing into the feeding inlet due to inertance when the pushing element extends out, and may also prevent the feedstock in the backward tilting segment from rolling into the feeding inlet when the pushing element is retracted.

Preferably, the pushing element is disposed below the discharge port; a height of an upper end surface of the pushing element relative to the bottom surface of the buffer channel is h1, and a height of the feedstock in the buffer channel relative to the bottom surface of the buffer channel is h2, h2≥h1, such that when the pushing element extends out, the feedstock above the buffer channel at least partially enters the buffer channel and contacts the upper end surface of the pushing element.

In the technical solution above, when the pushing element extends out, it may push the feedstock in the buffer channel into the feeding inlet. Meanwhile, the feedstock above the pushing element will enter the buffer channel via the discharge port and contacts the upper end surface of the pushing element, such that when the pushing element is retracted, the feedstock already falling on the pushing element may block backward rolling of the feedstock in the buffer channel, and after the pushing element is retracted, the feedstock on the pushing element may move downward continuously under gravity and contacts the bottom surface of the buffer channel, thereby completing charging.

Preferably, h2≥h1. This solution enables the feedstock above the pushing element to fall into the buffer channel as much as possible when the pushing element extends out, which enhances the blocking effect of the feedstock above the pushing element with respect to the feedstock in the buffer channel.

Preferably, the pushing mechanism comprises a first drive, a second drive, a first pushing element, and a second pushing element, the first drive driving the first pushing element to perform a reciprocating movement in the buffer channel, the second drive driving the second pushing element to perform a reciprocating movement in the buffer channel, the first pushing element and the second pushing element being arranged in juxtaposition below the discharge port, a height of an upper end surface of the second pushing element relative to the bottom surface of the buffer channel being h3, a height of the feedstock in the buffer channel relative to the bottom surface of the buffer channel being h2; when pushing the feedstock, the first pushing element and the second pushing element extend out simultaneously, such that after the feedstock in the buffer channel is completely pushed, the first pushing element is retracted first, such that the feedstock above the buffer channel at least partially enters the buffer channel and contacts the upper end surface of the second pushing element.

In the technical solution above, the height of the first pushing element is close to that of the feedstock. In a case of a need to charge the feedstock, the first pushing element and the second pushing element extend out simultaneously, which may push the feedstock in the buffer channel into the feeding inlet, and then the first pushing element is retracted while the second pushing element maintains stationary; this may prevent rolling-back of the feedstock in the buffer channel while allowing for the feedstock above the buffer channel to at least partially enter the buffer channel and contact the upper end face of the second pushing element; then, the second pushing element is retracted, and the feedstock on the second pushing element may continuously move downward under the gravity and contact the bottom surface of the buffer channel, thereby completing the charging.

Figure 1:
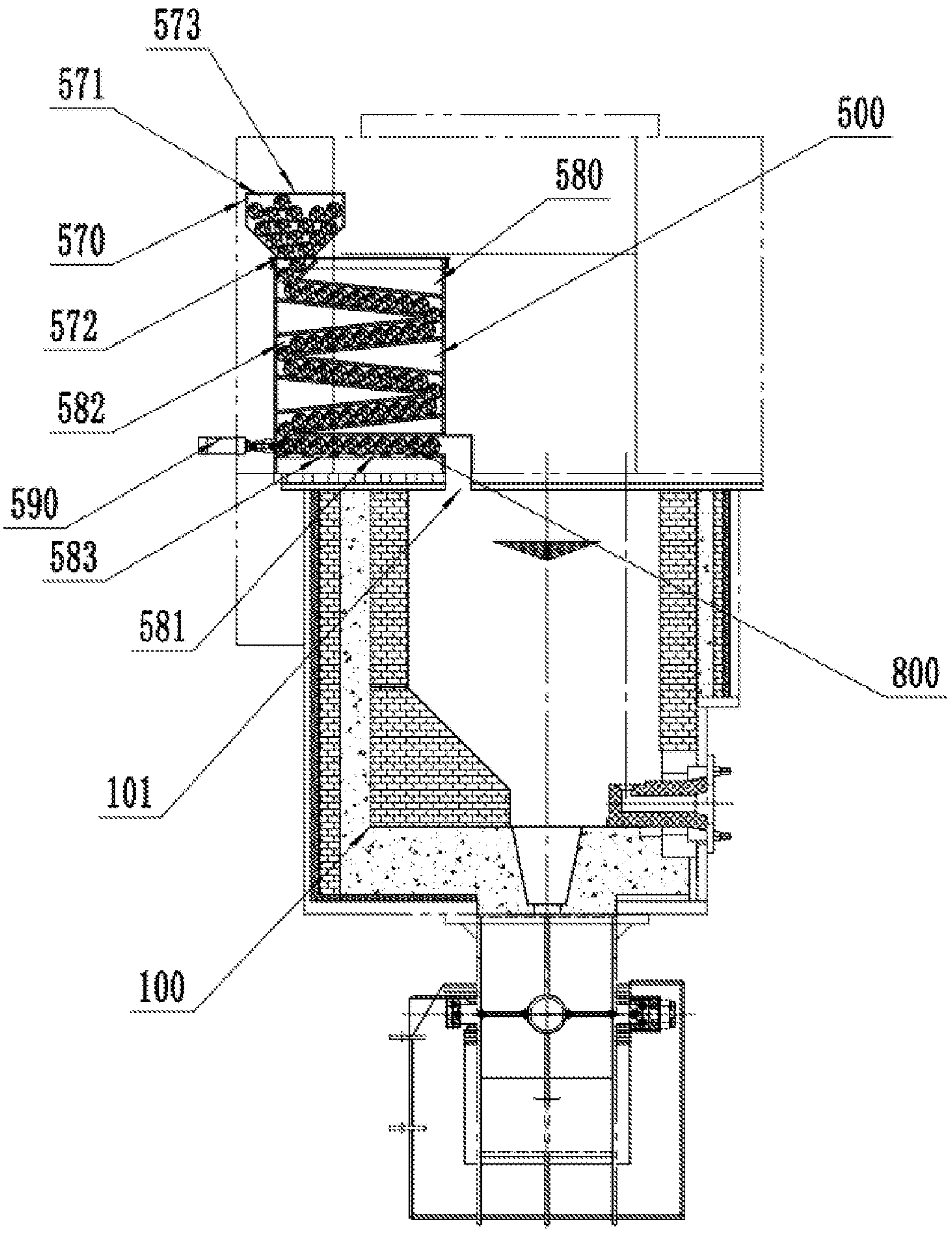
FIG. 1 is a structural schematic diagram of the disclosure.

Reference Numerals: furnace 100; chamber 110; feeding inlet 101; stirring disc 200; feedstock inlet 201; stirring rod 210; disc body 220; annular boss 230; drainage port 240; outer-ring wall 250; third opening 260; circular space 270; inner-ring wall 280; radial opening 290; drive device 300; lifting power element 310; rotating power element 320; splined sleeve 330; feedstock holding portion 400; cavity 410; first opening 420; second opening 430; baffle plate 440; automatic charging apparatus 500; hopper 570; inlet opening 571; outlet opening 572; closure 573; buffer bin 580; buffer channel 581; forward tilting segment 581.1; backward tilting segment 581.2; discharge port 581.3; storage channel 582; through hole 583; pushing mechanism 590; drive 591, first drive 591.1, second drive 591.2, pushing element 592, first pushing element 592.1; second pushing element 592.2; limiting block 584; inclined surface 585; feedstock 800.

DETAILED DESCRIPTION

Hereinafter, the disclosure will be described in further detail through example embodiments with reference to the accompanying drawings.

Example Embodiment 1

Figure 2:
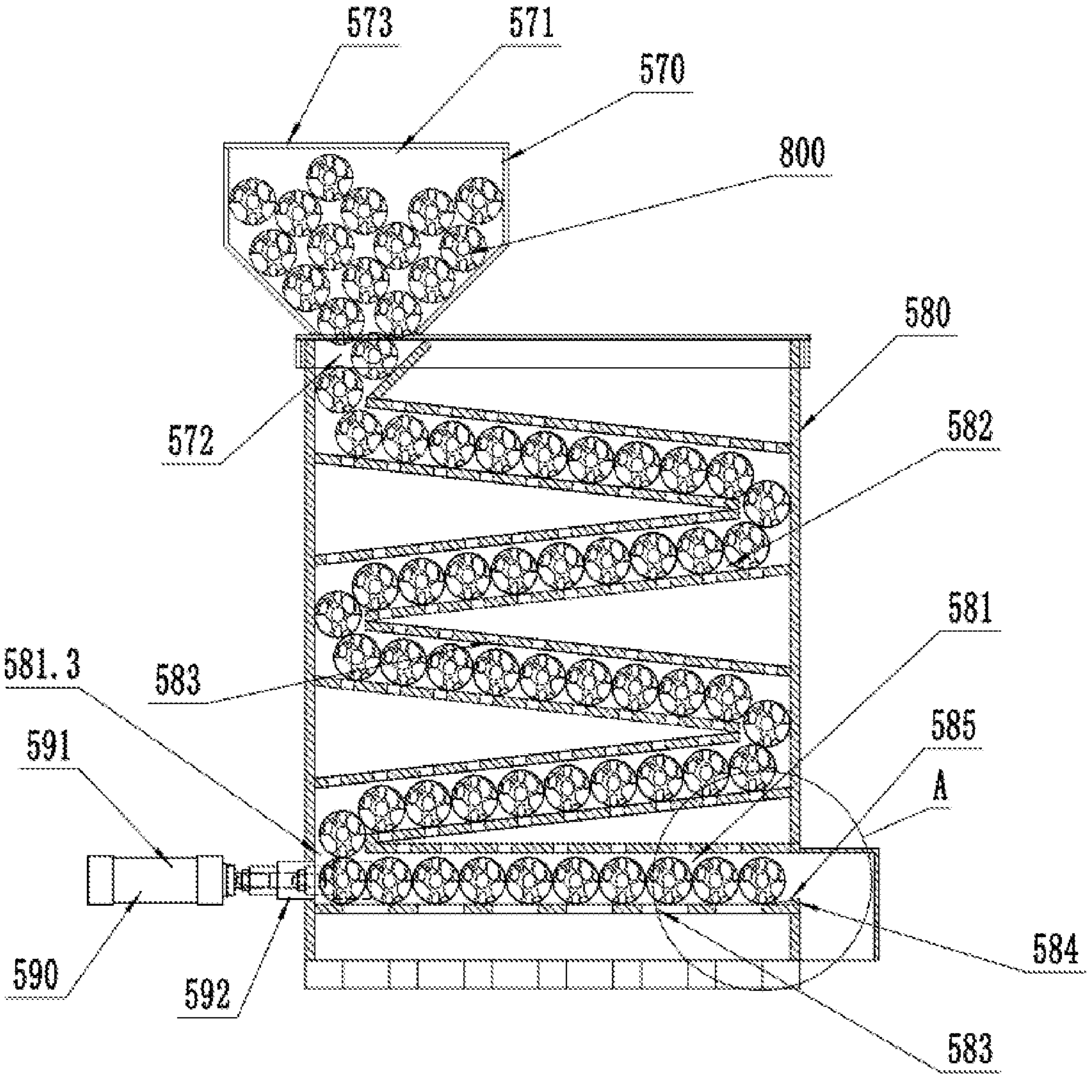
FIG. 2 is a structural schematic diagram of an automatic feedstock charging apparatus according to the disclosure.

FIGS. 1 and 2 illustrate an automatic charging apparatus for a furnace, comprising: a hopper 570, a buffer bin 580, and a pushing mechanism 590, the hopper 570 comprising an inlet opening 571 and an outlet opening 572, a buffer channel 581 being provided in the buffer bin 580, one end of the buffer channel 581 being provided with a discharge port 581.3 communicating with the outlet opening 572, the other end of the buffer channel 581 being in communication with a feeding inlet 101 of the furnace 100; the pushing mechanism 590 is configured to push feedstock 800 in the buffer channel 581 sequentially into the feeding inlet 101 of the furnace 100, the pushing mechanism 590 comprising a drive 591 and a pushing element 592, the drive 591 driving the pushing element 592 to move reciprocally in the buffer channel 581 such that the feedstock 800 in the buffer channel 581 is sequentially pushed into the feeding inlet 101 via reciprocal movement of the pushing element 592.

In the technical solution above, the feedstock 800 to be charged into the furnace 100 may be first inputted into the hopper 570 via the inlet opening 571; the inputting of the feedstock 800 into the hopper 570 may be done manually or automatically via a mechanical device. The feedstock 800 in the hopper 570 may sequentially enter the buffer channel 581 via the outlet opening 572, and then the pushing mechanism 590 sequentially pushes the feedstock 800 in the buffer channel 581 into the feeding inlet 101; each reciprocal movement of the pushing element 592 allows for pushing a certain amount of feedstock 800; by controlling the number of times of the reciprocal movement of the pushing element 592, the amount of feedstock 800 to be charged may be accurately controlled. Since the mass of each piece of feedstock 800 is substantially consistent, this solution may realize accurate control of the amount of the feedstock 800 charged. In addition, by controlling the speed of reciprocal movement of the pushing element 592, the charging speed of the feedstock 800 may be controlled such that the feedstock 800 may be charged into the furnace 100 at a constant speed. The drive 591 is fixed on an outer sidewall of the buffer bin 580, the pushing element 592 being slidingly connected to the buffer bin 580.

Preferably, a plurality of storage channels 582 are further inclinedly provided in the buffer bin 580, the plurality of storage channels 582 being successively arranged in a vertical direction, and in two neighboring storage channels 582, a lower end of the upper storage channel 582 is in communication with an upper end of the lower storage channel 582; the lowermost storage channel 582 is disposed above the buffer channel 581, the upper end of the uppermost storage channel 582 is in communication with the outlet opening 572, and the lower end of the lowermost storage channel 582 is in communication with the buffer channel 581.

In the technical solution above, a certain amount of feedstock 800 may be stored in the storage channels 582 so as to increase the amount of pre-stored feedstock 800.

Preferably, a cavity of the buffer bin 580 is in communication with a cavity of the furnace 100; a plurality of through holes 583 are provided on an inner wall of the buffer channel 581 and on inner walls of the storage channels 582, such that high-temperature gas in the furnace 100 can access the buffer channel 581 and the storage channels 582 in the buffer bin 580.

In the technical solution above, the high-temperature gas in the furnace 100 may access the buffer bin 580 and then enter the buffer channel 581 and the storage channels 582 via the through holes 583, such that the high-temperature gas may preheat the feedstock 800 in the buffer bin 580; in this way, heat of the high-temperature gas discharged from the inside of the furnace 100 may be sufficiently recycled, which saves energy; in addition, preheating of the feedstock 800 may reduce the melting time of the feedstock in the furnace 100, thereby enhancing production efficiency. The buffer bin 580 is provided with a gas discharging port for discharging the high-temperature gas.

It is understood that in an implementation, a closure 573 detachably connected to the hopper 570 is provided on the hopper 570, such that the closure 573 has a closed state for closing the inlet opening 571 and an open state for opening the inlet opening 571. The closure 573 may close the inlet opening 571 when no feedstock 800 is to be charged into the hopper 570, avoiding discharge of the high-temperature gas via the inlet opening 571. The detachable connection may refer to buckling, snap-fitting, and bolt fastening, etc.

It is understood that, in another implementation, a closure 573 hinged to the hopper 570 is provided on the hopper 570 such that the closure 573 has a closed state for closing the inlet opening 571 and an open state for opening the inlet opening 571. The closure 573 may close the inlet opening 571 when no feedstock 800 is to be charged into the hopper 570, avoiding discharge of the high-temperature gas via the inlet opening 571.

It is understood that, in an implementation, the drive 591 is a linear drive, the linear drive driving the pushing element 592 to perform a linear reciprocal movement in the buffer channel 581.

It is understood that, in another implementation, the drive may be a rotary drive, e.g., an electric motor, one end of the pushing element being fixed to the rotary drive, the rotary drive driving the pushing element to sway reciprocally, whereby the feedstock is pushed into the feeding inlet.

Example Embodiment 2

Figure 3:
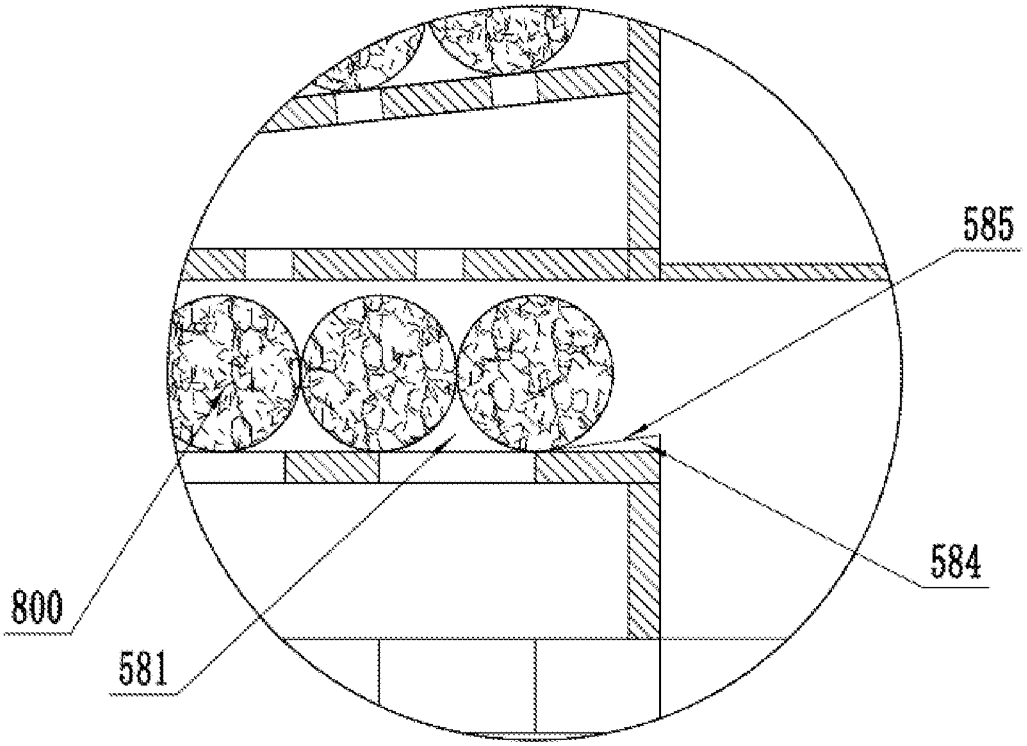
FIG. 3 is a local enlarged view of part A in FIG. 2.

As illustrated in FIGS. 1 to 3, based on the first example embodiment, a limiting block 584 is fixed to a bottom surface of one end of the buffer channel 581 proximal to the feeding inlet 101, an inclined surface 585 being provided on the limiting block 584, the inclined surface 585 facing the feedstock 800 in the buffer channel 581, the inclined surface 585 tilting from the side proximal to the feeding inlet 101 toward the side distant from the feeding inlet 101 such that the feedstock 800 can be pushed by the pushing element 592 to move toward the feeding inlet 101 along the inclined surface 585 and cross over the limiting block 584 into the feeding inlet 101.

In the technical solution above, when the pushing element 592 extends out, it may push the feedstock 800 in the buffer channel 581 to cross over the inclined surface 585 into the feeding inlet 101; the amount of the feedstock 800 entering the feeding inlet 101 is associated with an extended length of the pushing element 592; the remaining feedstock 800 in the buffer channel 581, which has not been pushed into the feeding inlet 101 yet, may be stopped by the limiting block 584 from rushing into the feeding inlet 101 due to inertance.

Preferably, the pushing element 592 is disposed below the discharge port 581.3, a bottom surface of the buffer channel 581 tilting toward the direction of the feeding inlet 101 from top to down, a tilt angle of the bottom surface of the buffer channel 581 being smaller than that of the inclined surface 585 such that when the pushing element 592 is retracted, the feedstock 800 in the buffer channel 581 is retained in the buffer channel 581.

In the technical solution above, the feedstock 800 in the buffer channel 581 may move toward the feeding inlet 101, such that when the pushing element 592 is retracted, backward movement of the feedstock 800 along with the pushing element 592 may be avoided, such that the feedstock 800 in the storage channels 582 may smoothly fall into the buffer channel 581.

Example Embodiment 3

Figure 4:
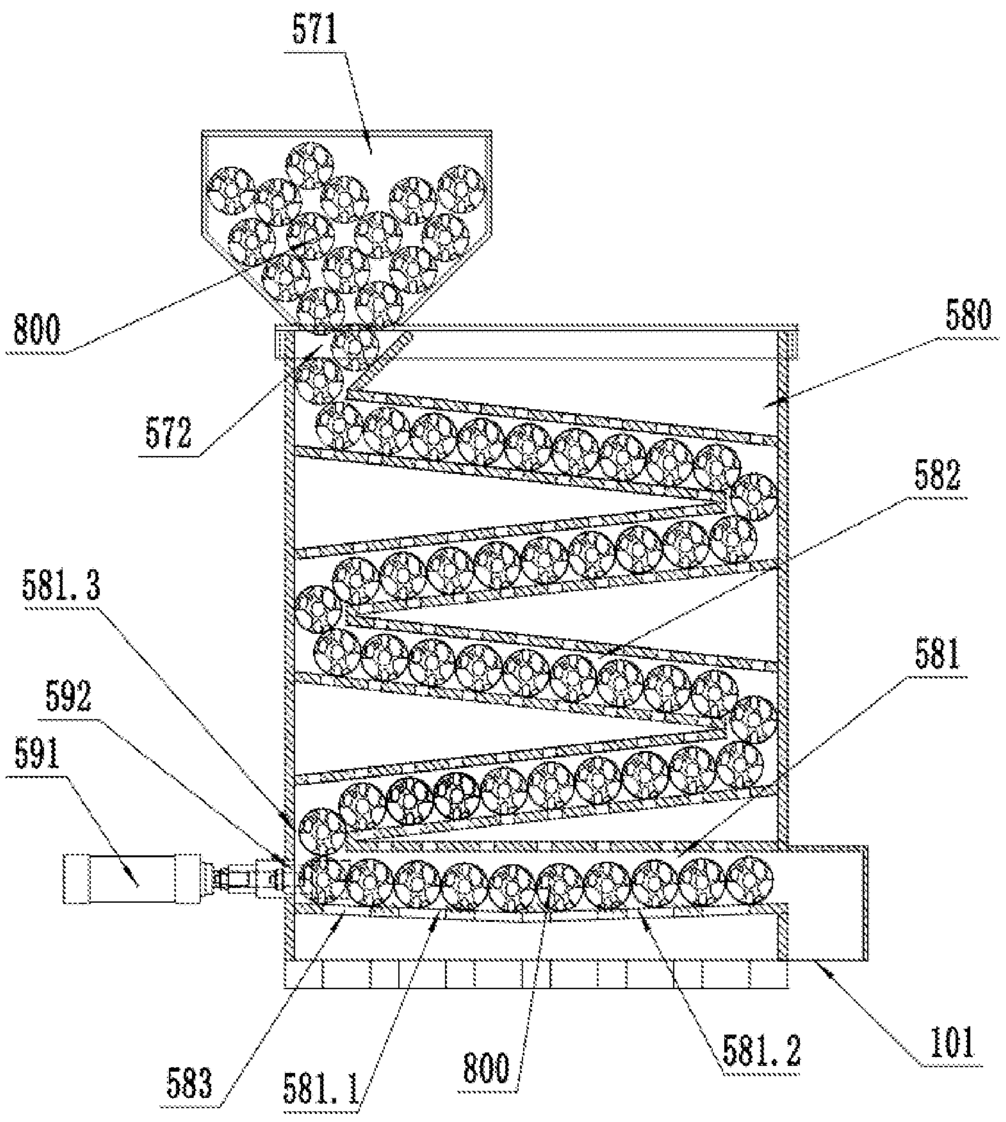
FIG. 4 is a structural schematic diagram of a third example embodiment of the disclosure.

As illustrated in FIG. 4, based on Example Embodiment 1, the pushing element 592 is disposed below the discharge port 581.3, the buffer channel 581 comprising a forward tilting segment 581.1 and a backward tilting segment 581.2, the forward tilting segment 581.1 being disposed at a side proximal to the pushing mechanism 590, the backward tilting segment 581.2 being disposed at a side proximal to the feeding inlet 101, a bottom surface of the forward tilting segment 581.1 tilting toward the direction of the feeding inlet 101 from top to down, a bottom surface of the backward tilting segment 581.2 tilting toward the direction of the feeding inlet 101 from down to top.

In the technical solution above, the tilting arrangement of the bottom surface of the forward tilting segment 581.1 toward the direction of the feeding inlet 101 from top to down allows for the feedstock 800 in the forward tilting segment 581.1 to move toward the feeding inlet 101, which may prevent the feedstock 800 to move backward when the pushing element 592 is retracted, such that the feedstock 800 in the storage channels 582 may smoothly fall into the buffer channel 581. The tilting arrangement of the bottom surface of the backward tilting segment 581.2 toward the feeding inlet 101 from down to top may prevent the feedstock 800 in the backward tilting segment 581.2, which has not been pushed into the feeding inlet 101 yet, from rushing into the feeding inlet 101 due to inertance when the pushing element 592 extends out and may also prevent the feedstock 800 in the backward tilting segment 581.2 from rolling into the feeding inlet 101 when the pushing element 592 is retracted.

In this example embodiment, the forward tilting segment 581.1 and the backward tilting segment 581.2 may be connected directly or via a horizontal segment which is horizontally disposed.

Example Embodiment 4

Based on the Example Embodiment 1, the bottom surface of the buffer channel tilts toward the feeding inlet from down to top. This arrangement may prevent the feedstock in the buffer channel from rolling into the feeding inlet.

Example Embodiment 5

Figure 5:
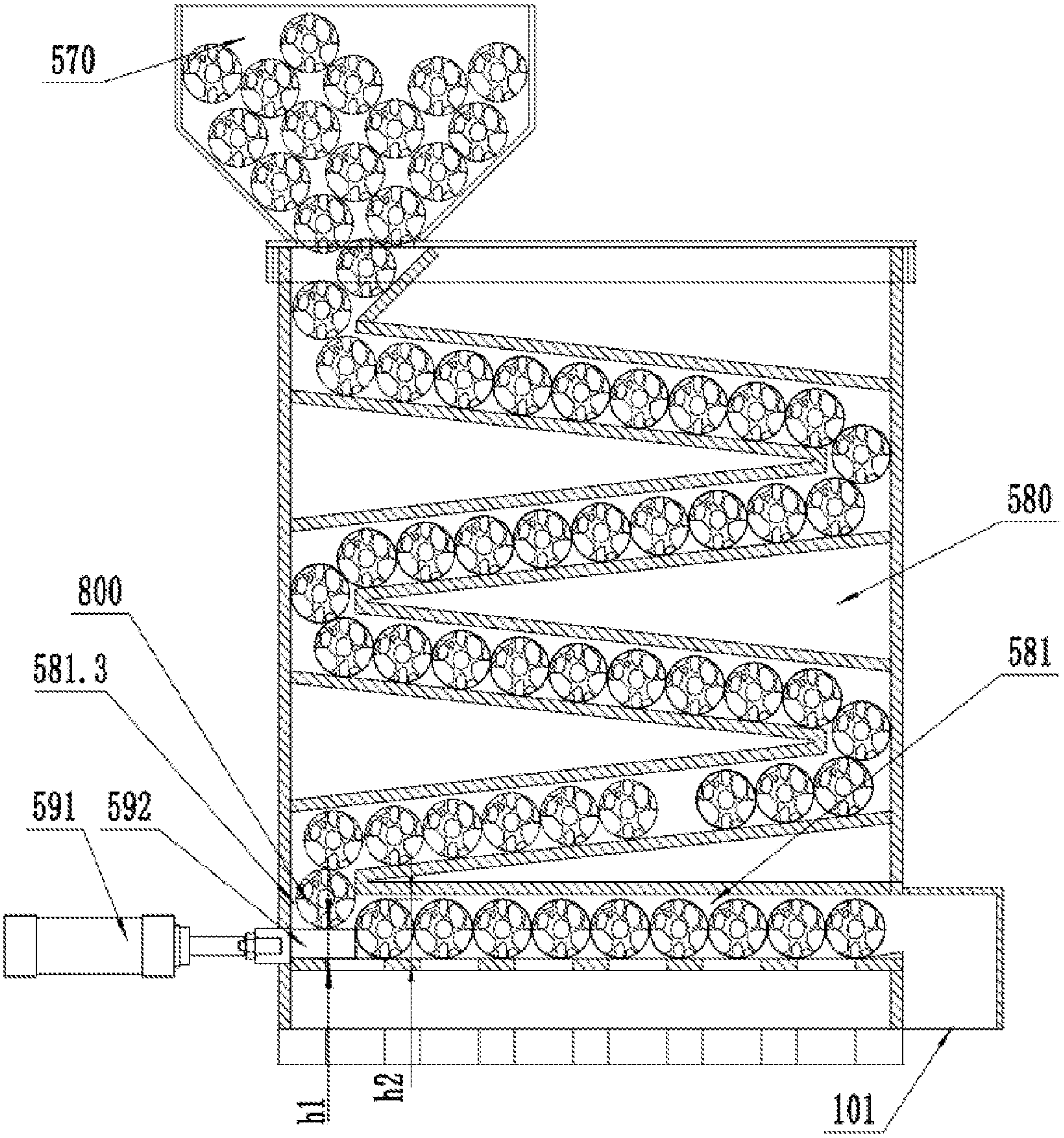
FIG. 5 is a first structural schematic diagram of a fifth example embodiment of the disclosure.
Figure 6:
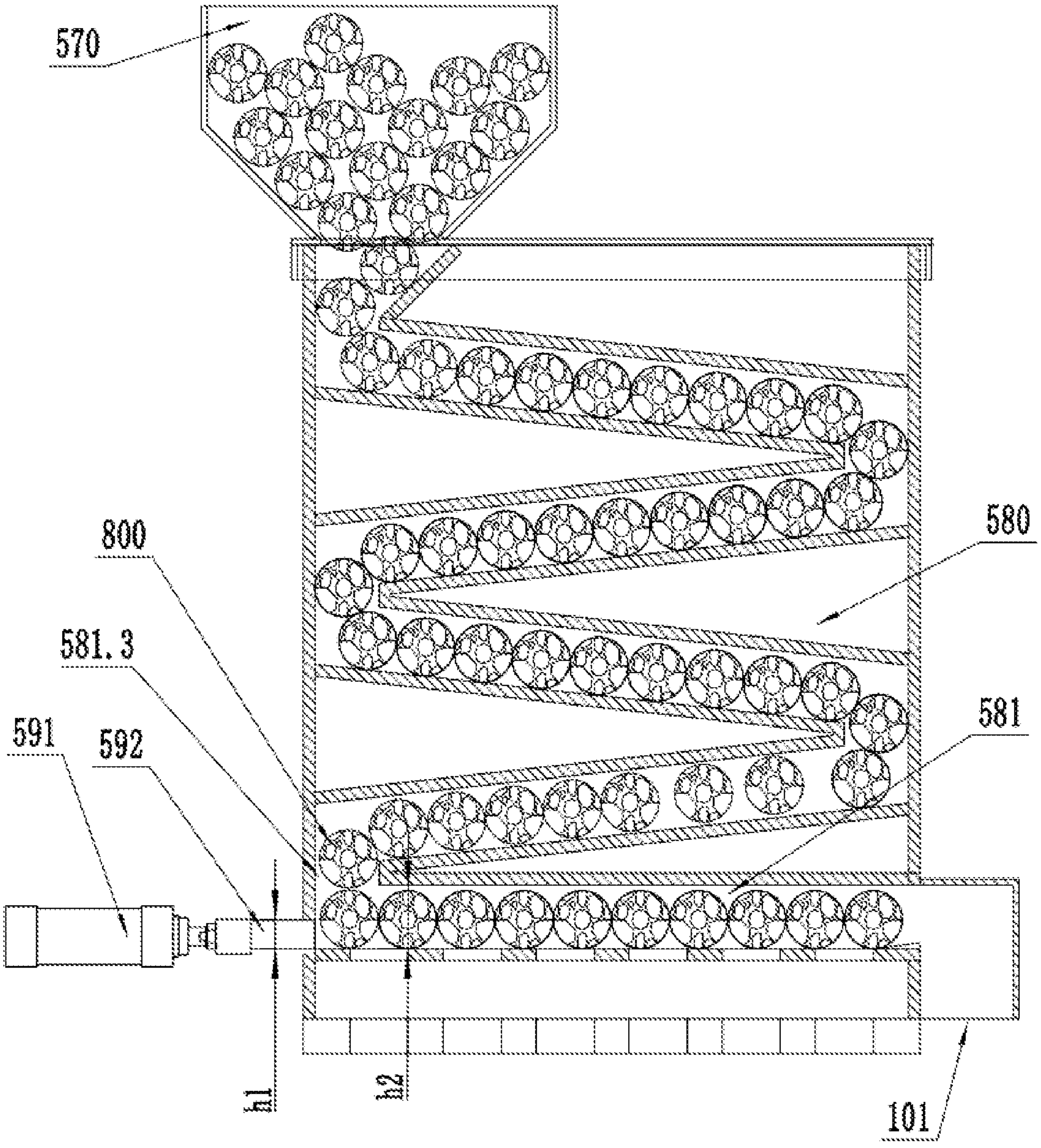
FIG. 6 is a second structural schematic diagram of the fifth example embodiment of the disclosure.

As illustrated in FIGS. 5 and 6, based on Example Embodiment 1, the pushing element 592 is disposed below the discharge port 581.3; a height of an upper end surface of the pushing element 592 relative to the bottom surface of the buffer channel 581 is h1 and a height of the feedstock in the buffer channel 581 relative to the bottom surface of the buffer channel 581 is h2, h2≥h1, such that when the pushing element 592 extends out, the feedstock 800 above the buffer channel 581 at least partially enters the buffer channel 581 and contacts the upper end surface of the pushing element 592.

When the pushing element 592 extends out, the feedstock 800 below the discharge port 581.3 will be pushed forward, and the foremost feedstock 800 in the buffer channel 581 will fall into the feeding inlet 101; while when the pushing element 592 is retracted, the feedstock 800 rolls back till under or below the discharge port 581.3 along with the pushing element 592, and the rolling-back feedstock 800 will block the feedstock 800 above the discharge port 581.3 from falling off, such that the feedstock 800 above the discharge port 581.3 cannot fall into the buffer channel 581 and is stuck at the discharge port 581.3; as a result, no feedstock 800 will be replenished into the buffer channel 581, and thereafter, when the pushing element 592 extends out again, since the buffer channel 581 has no new feedstock 800 replenished, there will be no feedstock 800 to be pushed from the buffer channel 581 into the feeding inlet 101, such that the automatic charging apparatus cannot charge the feedstock in an accurate and smooth manner. In this example embodiment, when the pushing element 592 extends out, it may push the foremost feedstock 800 in the buffer channel 581 into the feeding inlet 101. Meanwhile, the feedstock 800 above the pushing element 592 will partially enter the buffer channel 581 via the discharge port 581.3 and contact the upper end surface of the pushing element 592, such that when the pushing element 592 is retracted, the feedstock 800 already falling on the pushing element 592 may block backward rolling of the feedstock 800 in the buffer channel 581, and after the pushing element 592 is retracted, since the feedstock 800 on the pushing element 592 has been at least partially located in the buffer channel 581, it is not easily stuck by the feedstock in the buffer channel 581; in this way, the feedstock 800 on the pushing element 592 may move downward continuously under gravity and contact the bottom surface of the buffer channel 581, thereby completing charging.

Preferably, h2≥h1. This solution enables the feedstock 800 above the pushing element 592 to fall into the buffer channel 581 as much as possible when the pushing element 592 extends out, which enhances the blocking effect of the feedstock 800 above the pushing element 592 with respect to the feedstock 800 in the buffer channel 581, such that the feedstock 800 above the discharge port 581.3 may enter the buffer channel 581 more smoothly.

In this example embodiment, in order to prevent the feedstock 800 in the buffer channel 581 from rolling into the feeding inlet 101 before the pushing element 592 pushes the feedstock 800, the bottom surface of the buffer channel 581 tilts toward the direction of the feeding inlet 101 from down to top.

Example Embodiment 6

Figure 7:
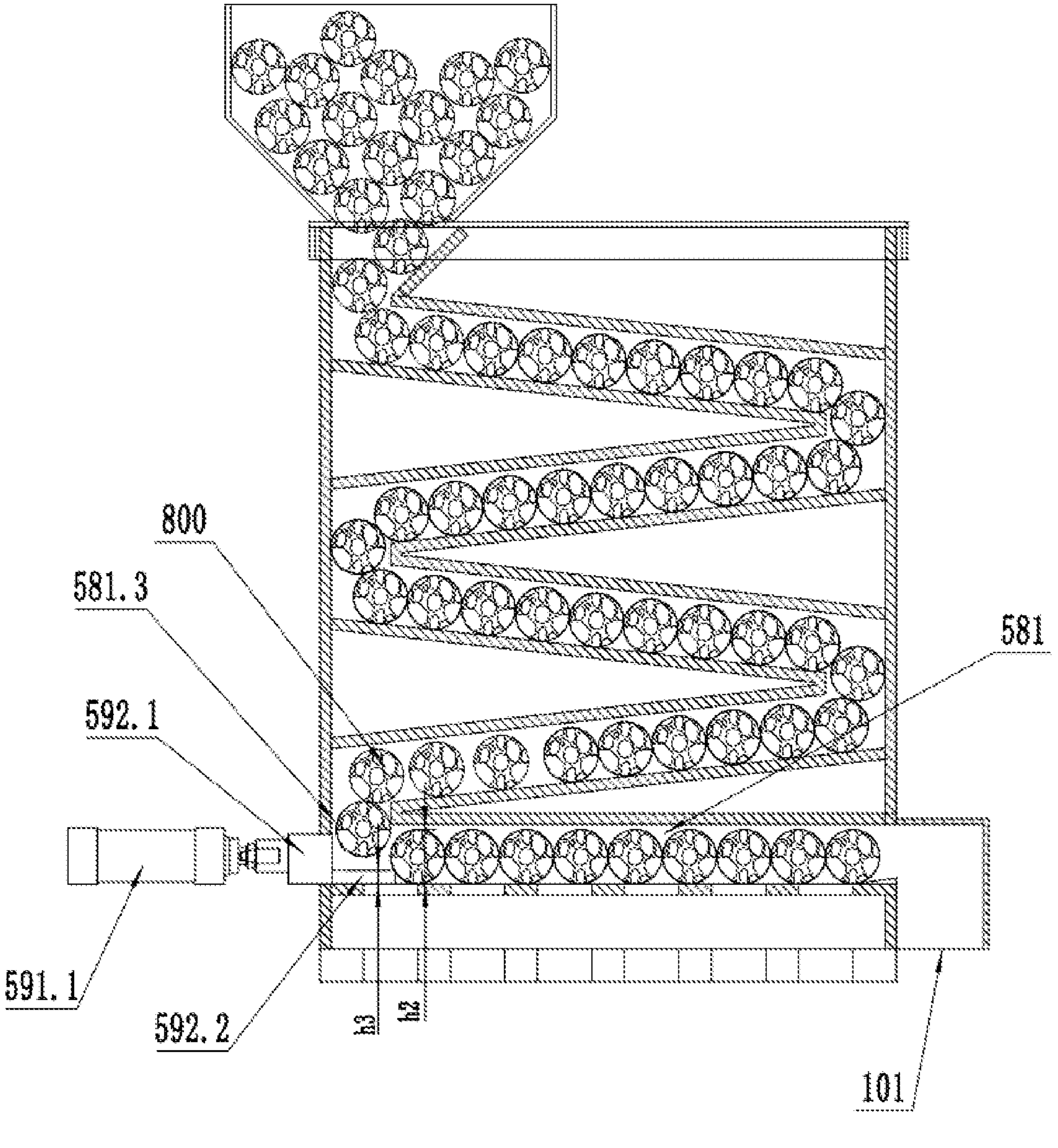
FIG. 7 is a structural schematic diagram of a sixth example embodiment of the disclosure.
Figure 8:
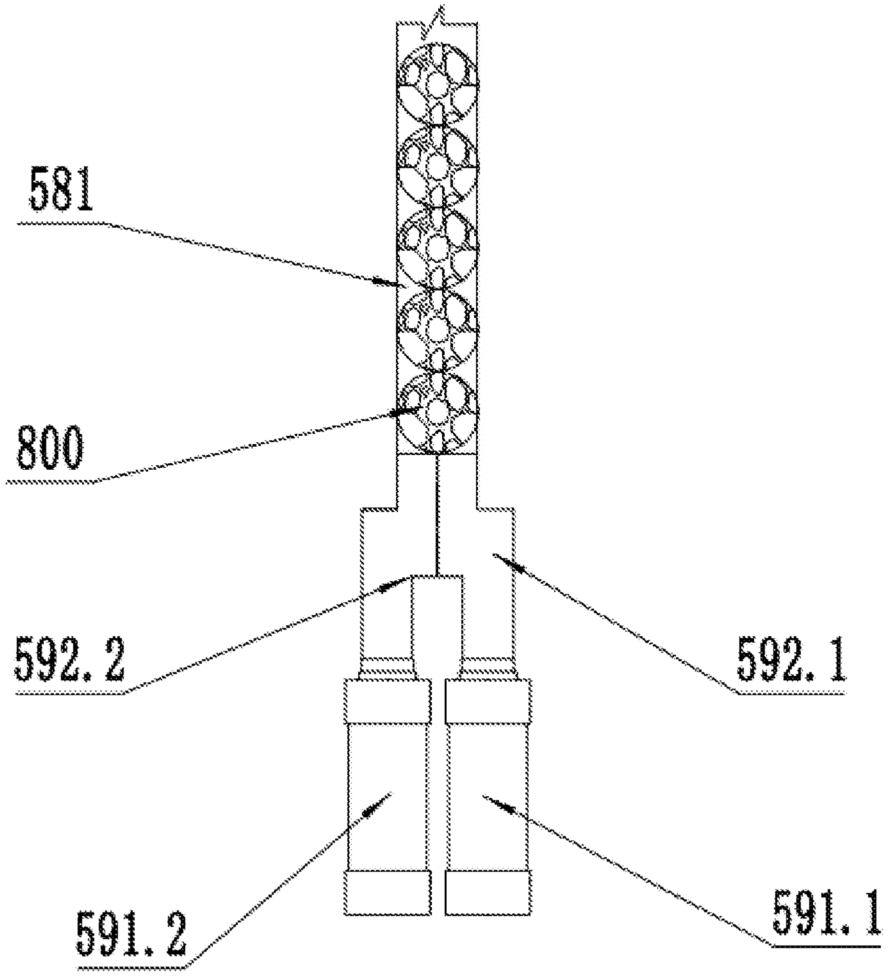
FIG. 8 is a structural schematic diagram of a pushing mechanism in the sixth example embodiment of the disclosure.
Figure 9:
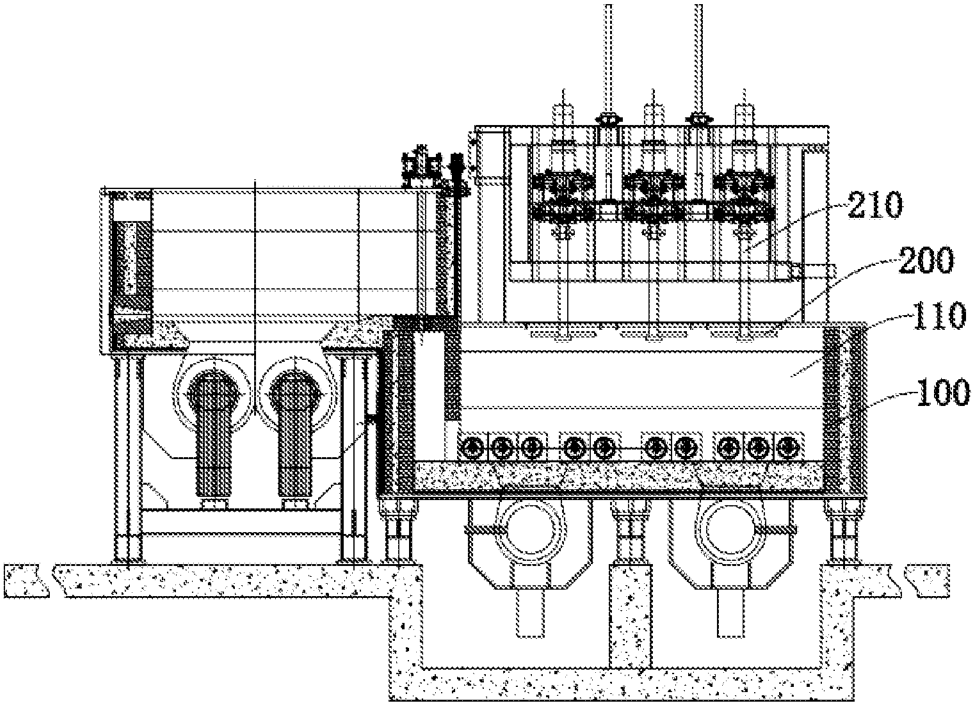
FIG. 9 is a structural schematic diagram of a metal melting furnace including a stirring device when a stirring disc is lowered in a seventh example embodiment of the disclosure.
Figure 10:
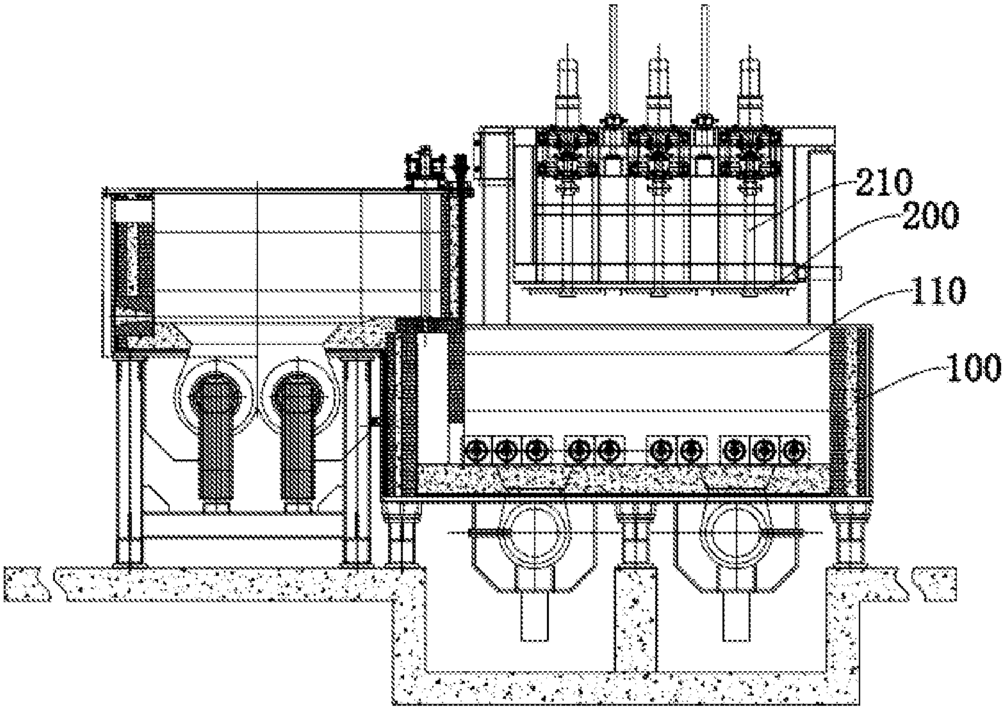
FIG. 10 is a structural schematic diagram of the metal melting furnace including a stirring device when the stirring disc is lifted in the seventh example embodiment of the disclosure.
Figure 11:
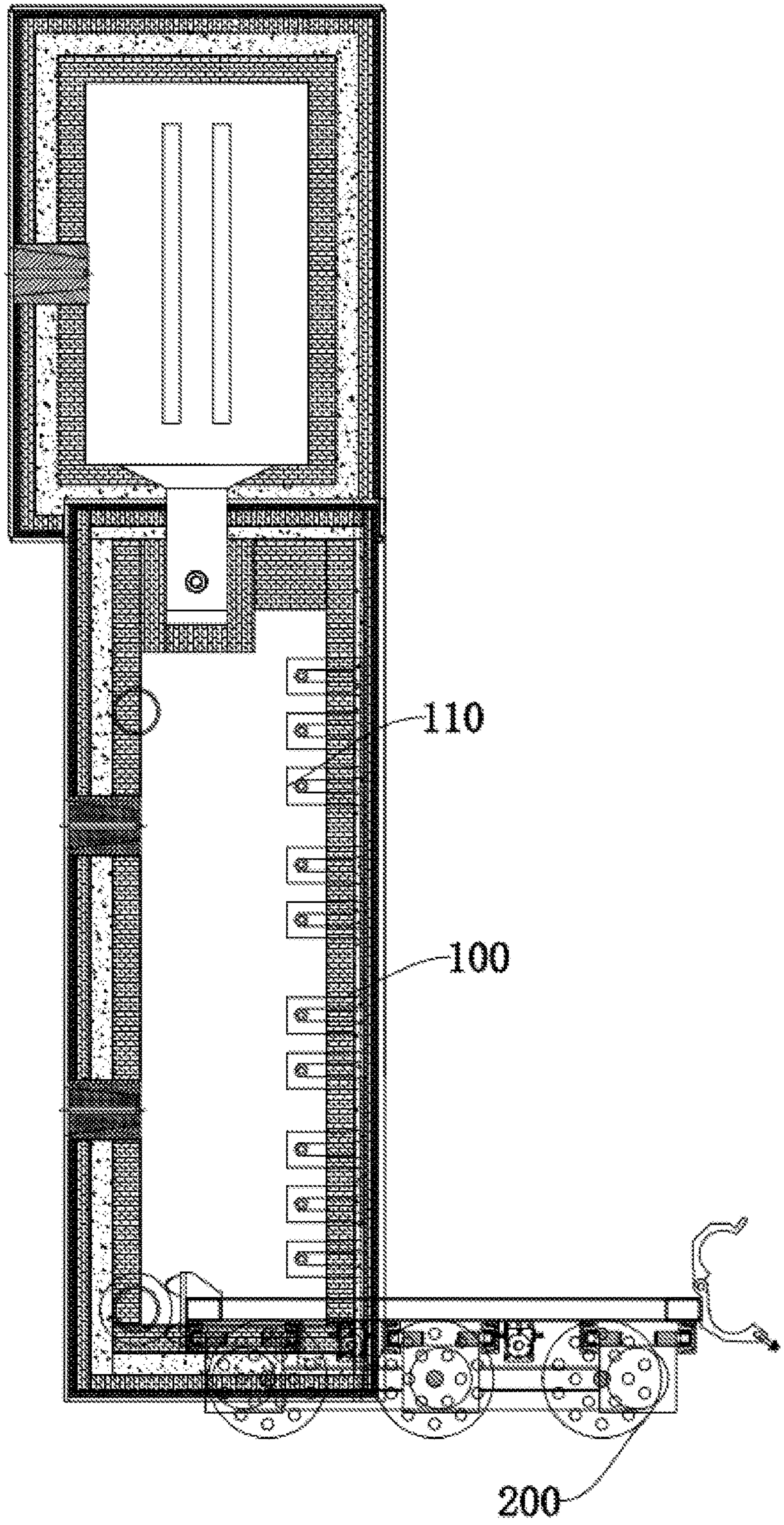
FIG. 11 is a top view of the metal melting furnace including a stirring device in the seventh example embodiment of the disclosure.

As illustrated in FIGS. 7 and 8, based on Example Embodiment 1, the pushing mechanism 590 comprises a first drive 591.1, a second drive 591.2, a first pushing element 592.1, and a second pushing element 592.2, the first drive 591.1 driving the first pushing element 592.1 to perform a reciprocating movement in the buffer channel 581, the second drive 591.2 driving the second pushing element 592.2 to perform a reciprocating movement in the buffer channel 581, the first pushing element 592.1 and the second pushing element 592.2 being disposed in juxtaposition below the discharge port 581.3, a height of the second pushing element 592.2 being lower than that of the first pushing element 592.1, where the height of the upper end surface of the second pushing element 592.2 relative to the bottom surface of the buffer channel 581 is h3 and the height of the feedstock 800 in the buffer channel 581 relative to the bottom surface of the buffer channel 581 is h2, 3h3≤h2≤4h3; when pushing the feedstock, the first pushing element 592.1 and the second pushing element 592.2 simultaneously extend out; after the feedstock 800 in the buffer channel 581 is completely pushed, the first pushing element 592.1 is retracted first, such that the feedstock 800 above the buffer channel 581 at least partially enters the buffer channel 581 and contacts the upper end face of the second pushing element 592.2.

When the pushing element 592 extends out, the feedstock 800 below the discharge port 581.3 will be pushed forward, and the foremost feedstock 800 in the buffer channel 581 will fall into the feeding inlet 101; while when the pushing element 592 is retracted, the feedstock 800 rolls back till under or below the discharge port 581.3 along with the pushing element 592, and the rolling-back feedstock 800 will block the feedstock 800 above the discharge port 581.3 from falling off, such that the feedstock 800 above the discharge port 581.3 cannot fall into the buffer channel 581 and is stuck at the discharge port 581.3; as a result, no feedstock 800 is replenished into the buffer channel 581, and thereafter, when the pushing element 592 extends out again, since the buffer channel 581 has no new feedstock 800 replenished, there will be no feedstock 800 to be pushed from the buffer channel 581 into the feeding inlet 101, such that the automatic charging apparatus cannot charge the feedstock in an accurate and smooth manner. In this example embodiment, in a case of a need to charge the feedstock, the first pushing element 592.1 and the second pushing element 592.2 extend out simultaneously, which may push the foremost feedstock 800 in the buffer channel 581 into the feeding inlet 101, and then the first pushing element 592.1 is retracted while the second pushing element 592.2 maintains stationary; this may prevent rolling-back of the feedstock 800 in the buffer channel 581 while allowing for the feedstock 800 above the buffer channel 581 to at least partially enter the buffer channel 581 and contact the upper end face of the second pushing element 592.2; at which time, the part of feedstock 800 having fallen into the buffer channel 581 may block rolling-back of the feedstock 800 previously disposed in the buffer channel 581; then, the second pushing element 592.2 is retracted; since the feedstock 800 on the second pushing element 592.2 has been partially located in the buffer channel 581, it is not easily stuck by the feedstock in the buffer channel 581; therefore, the feedstock 800 on the second pushing element 592.2 may continuously move downward under the gravity and contact the bottom surface of the buffer channel 581, thereby completing the charging.

In this example embodiment, simultaneous extension of the first pushing element 592.1 and the second pushing element 592.2 may ensure that the feedstock 800 in the buffer channel 581 is pushed into the feeding inlet 101, while after the first pushing element 592.1 and the second pushing element 592.2 extend out, it is only needed to limit the feedstock 800 in the buffer channel 581 to prevent its backward-rolling, without a need to provide a power for pushing the feedstock 800. Therefore, the second pushing element 592.2 may be disposed lower in height. In some implementations, h3≤h2/3, namely 3h3≤h2. Lower height of the second pushing element 592.2 allows for enough feedstock 800 above the buffer channel 581 to fall into the buffer channel 581 after the first pushing element 592.1 is retracted, which can block the feedstock 800 falling into the buffer channel 581 from rolling back, and ensures the feedstock 800 to completely fall into the buffer channel 581 after the second pushing element 592.2 is retracted. If the second pushing element 592.2 is arranged too low, the feedstock 800 in the buffer channel 581 might roll till above the pushing element 592, unable to block backward-rolling of the feedstock 800; therefore, in order to guarantee the blocking effect, it is needed to provide a certain height for the second pushing element 592.2, which, in some implementations, may be h2/4≤h3, i.e., h2≤4h3.

Furthermore, the height of the first pushing element 592.1 is h4, h4≥h2/2, which ensures that the first pushing element 592.1 may smoothly push the feedstock 800 in the buffer channel 581 to move forward. In some implementations, the height of the first pushing element 592.1 is equal to that of the feedstock 800.

In this example embodiment, in order to prevent the feedstock 800 in the buffer channel 581 from rolling into the feeding inlet 101 before the pushing element 592 pushes the feedstock 800, the bottom surface of the buffer channel 581 tilts toward the direction of the feeding inlet 101 from down to top.

Example Embodiment 7

FIGS. 1 to 18 illustrate a metal melting furnace including a stirring device, comprising a furnace 100 and a stirring device, the furnace 100 defining a chamber 110 for accommodating molten metal, the stirring device being configured to sufficiently mix feedstock charged into the chamber 110 with the molten metal such that the feedstock is homogeneously distributed in the molten metal. The stirring device comprises a stirring disc 200, a stirring rod 210 connected to the stirring disc 200, and a drive device 300 in drive connection to the stirring rod 210, the stirring disc 200 having a feedstock holding portion 400, the drive device 300 being configurable to drive the stirring rod 210 to move up and down such that the stirring disc 200 is immersed in or lifted out of the molten metal in the chamber 110, a plurality of vertically through opening being provided on the stirring disc 200 such that during the stirring process, the feedstock in the feedstock holding portion 400, along with the stirring disc 200, is immersed in the molten metal in which the feedstock is melted, the drive device 300 being configured to drive the stirring rod 210 to lift reciprocally.

According to the disclosure, during the smelting process of the metal melting furnace including a stirring device, the feedstock charged into the molten metal can be held on the stirring disc 200 via the feedstock holding portion 400, such that the feedstock, along with the stirring disc 200, may be immersed into the molten metal, without floating on top of the molten metal, which prevents oxidization reaction and abnormal loss of the feedstock due to being exposed to the air in a high-temperature environment; in addition, this design can also increase oxygen content in the molten metal, and prevents inhomogeneous composition distribution of the molten metal due to floating of the feedstock on top of the molten metal or sinking of the feedstock to the bottom of the molten metal. The stirring rod 210 is configurable to lift reciprocally under the action of the drive device 300, such that the stirring disc 200 moves up and down in the molten metal, which may enhance homogeneity of the feedstock in the molten metal, thereby ensuring consistent quality of metal products; in addition, this design eliminates a need of manual stirring, reduces labor intensity of operators, and lowers risks. Moreover, automated stirring offers a larger stirring range than manual stirring and avoids the quality issue arising from insufficient stirring in some areas of the molten metal, which also gives a higher stirring efficiency than manual operation.

The vertically through openings allow for the molten metal to pass through the stirring disc 200, which reduces the resistance subjected to the stirring disc 200 when moving up and down in the molten metal and avoids extensive diffusion of bottom-layer impurities caused by the induced vortex of the molten metal, such that the molten metal may flow gently during up-and-down movement of the stirring disc 200. Generally, extensive impurities would be deposited at the bottom layer of molten metal; the molten metal at the bottom layer does not participate in the casting process, but always resides in the melting furnace till the furnace is scrapped. In the disclosure, since the stirring disc 200 carrying the feedstock does not induce extensive diffusion of the impurities during the melting process, the quality of the molten metal available for casting in the chamber 110 will not be affected; in addition, it takes less time for letting the stirred molten metal stand till the impurities settle, without incurring unnecessary energy waste; and meanwhile, the disclosure may enhance smelting efficiency of the molten metal and thus improve productivity.

In the disclosure, the molten metal refers to molten copper, and the feedstock refers to zinc; alternatively, the feedstock may be other elements or compounds, and the molten metal may also be molten iron, molten steel, etc.

Since the molten metal is rapidly cooled down when being exposed to the air, it is improper to design a movable part on the stirring disc 200 to hold the feedstock; in addition, after the feedstock size is shrunk, it becomes unholdable. Referring to FIGS. 12 to 18, based on the example embodiments described supra, in one implementation of the disclosure, the feedstock holding portion 400 defines a cavity 410 for accommodating the feedstock, and the openings comprise a first opening 420 provided in the top wall of the cavity 410 and a second opening 430 provided in the bottom wall of the cavity 410, the first opening 420 and the second opening 430 having a size smaller than that of the feedstock; during the stirring process, the molten metal may access the cavity 410 via the first opening 420 and the second opening 430, where it is sufficiently mixed with the feedstock. Then, the molten metal mixed with the feedstock composition flows out of the cavity 410 via the first opening 420 and the second opening 430 to be mixed with external molten metal, whereby the feedstock is sufficiently distributed in the molten metal. Since the sizes of the first opening 420 and the second opening 430 are smaller than that of the feedstock, the feedstock can be kept in the cavity 410; with the feedstock being melt, its size is shrunk to be smaller than that of the first opening 420 and that of the second opening 430, such that it likely escapes from the stirring disc 200 via the first opening 420 and the second opening 430; however, since the shrunk size of the feedstock is very small, even if it floats on top of the molten melt or sinks to the bottom of the molten melt, it has little impact on the composition of molten metal; in addition, if the molten metal has a higher melting point, the feedstock will be completely melted before floating on top of the molten metal or sinking to the bottom of the molten metal.

In addition, a feedstock inlet 201 in communication with the cavity 410 is provided on an upper surface of the stirring disc 200, such that the feedstock may be replenished into the cavity 410 via the feedstock inlet 201. The size of the feedstock inlet 201 is slightly greater than that of the feedstock. In an example implementation, a ratio of the size of the feedstock inlet 201 to the size of the feedstock ranges from 11/10 to 6/5. With this design, it becomes more difficult for the feedstock to leave the cavity 410 via the feedstock inlet 201.

Furthermore, the bottom wall of the cavity 410 has a height gradually reduced from the feedstock inlet 201 toward the direction of the first opening 420. In the disclosure, the feedstock is a spherical object, which, after being charged into the cavity 410 via the feedstock inlet 201, may move, under its own gravity, till beneath the first opening 420 along the bottom wall of the cavity 410; in this way, if the feedstock has a density greater than that of the molten metal, the feedstock can be kept at the bottom wall of the cavity 410 without entering the molten metal via the feedstock inlet 201 during up-and-down movement of the stirring disc 200; if the feedstock has a density smaller than that of the molten metal, the feedstock will float up to abut against the top wall of the cavity 410 after the stirring disc 200 is immersed in the molten metal, in which case since the floating feedstock is located beneath the first opening 420, it does not easily enter the molten metal via the feedstock inlet 201.

Referring to FIGS. 13 to 18, based on the example embodiments described supra, in one implementation of the disclosure, the feedstock holding portion 400 further comprises a baffle plate 440, the baffle plate 440 being formed as extending from the cavity 410 between the feedstock inlet 201 and the first opening 420 toward the bottom wall of the cavity 410, both sides of the baffle plate 440 being connected to the sidewall of the cavity 410. In a case that the density of the feedstock is lower than that of the molten metal, the feedstock will move upward after the stirring disc 200 is immersed in the molten metal; the baffle plate 440 serves to baffle the upward floating feedstock and limit the feedstock from moving toward the feedstock inlet 201. The feedstock before floating upward is located in the cavity 410 offset from the feedstock inlet 201; since the surface of the molten metal flows gently, the feedstock's upward floating follows a substantially vertically linear course, such that it does not easily move toward the direction of the feedstock inlet 201 during the upward floating process; even if the upward floating feedstock has a tendency of moving toward the feedstock inlet 201, it will be baffled and stopped by the lower end of the baffle plate 440 after floating upward a certain height, thereby avoiding the circumstance that the feedstock is separated from the stirring disc 200 during the process of immersing the stirring disc 200 in the molten metal. In addition, since both sides of the baffle plate 440 are connected to the sidewall of the cavity 410, the feedstock cannot bypass the baffle plate 440 to move toward the feedstock inlet 201.

Figure 13:
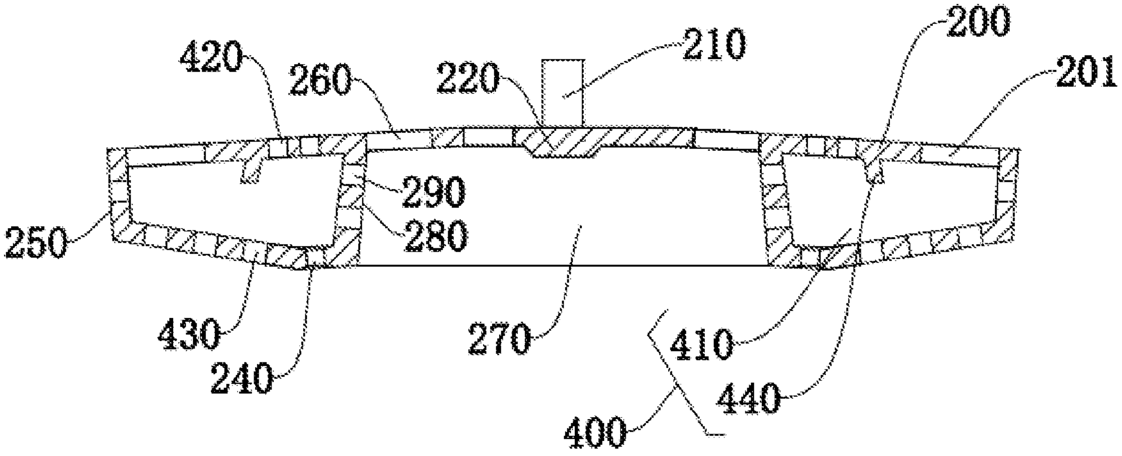
FIG. 13 is a sectional view of the stirring disc in the seventh example embodiment of the disclosure.
Figure 14:
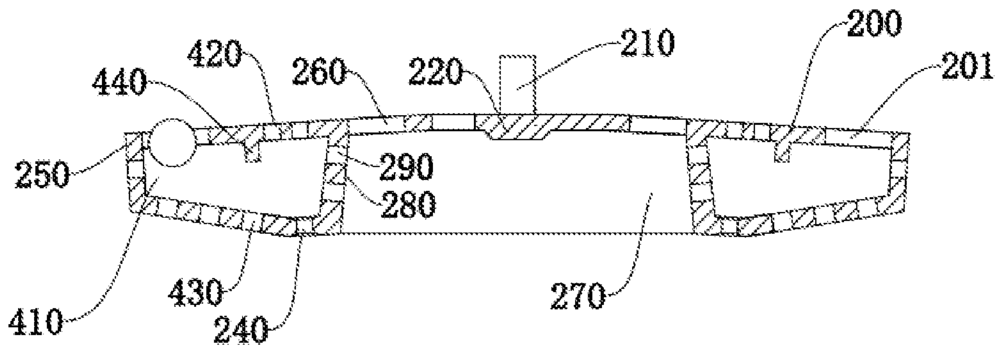
FIG. 14 is a sectional view of the stirring disc when feedstock is charged into a feedstock inlet in the seventh example embodiment of the disclosure.
Figure 15:
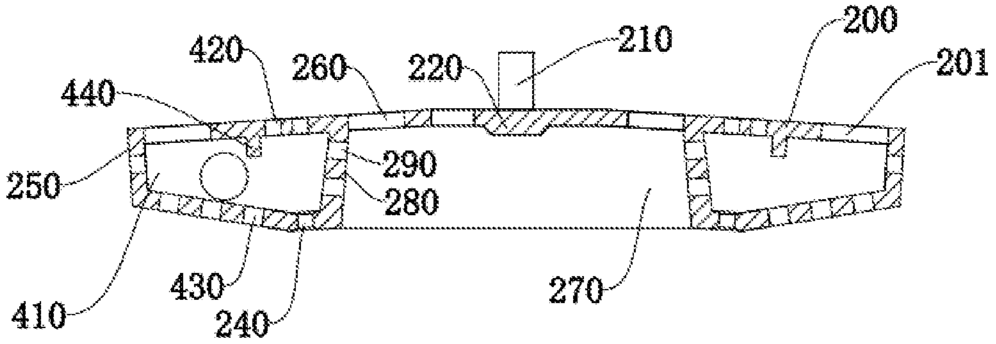
FIG. 15 is a sectional view of the stirring disc when the feedstock enters the cavity in the seventh example embodiment of the disclosure.
Figure 16:
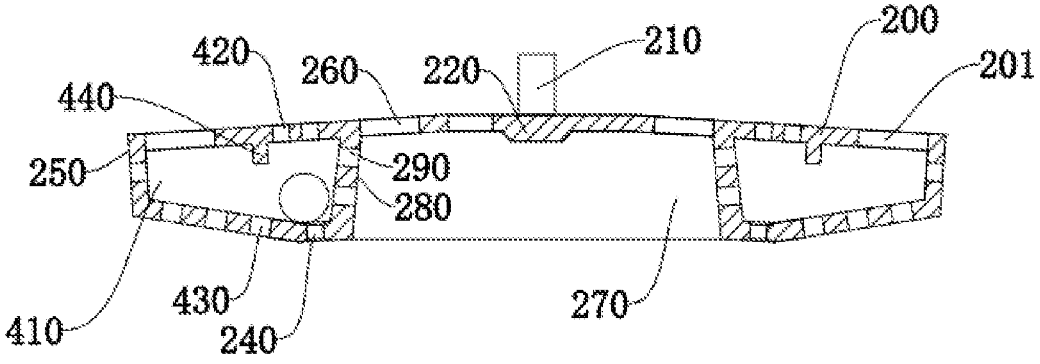
FIG. 16 is a sectional view of the stirring disc when the feedstock rolls below the first opening in the seventh example embodiment of the disclosure.
Figure 17:
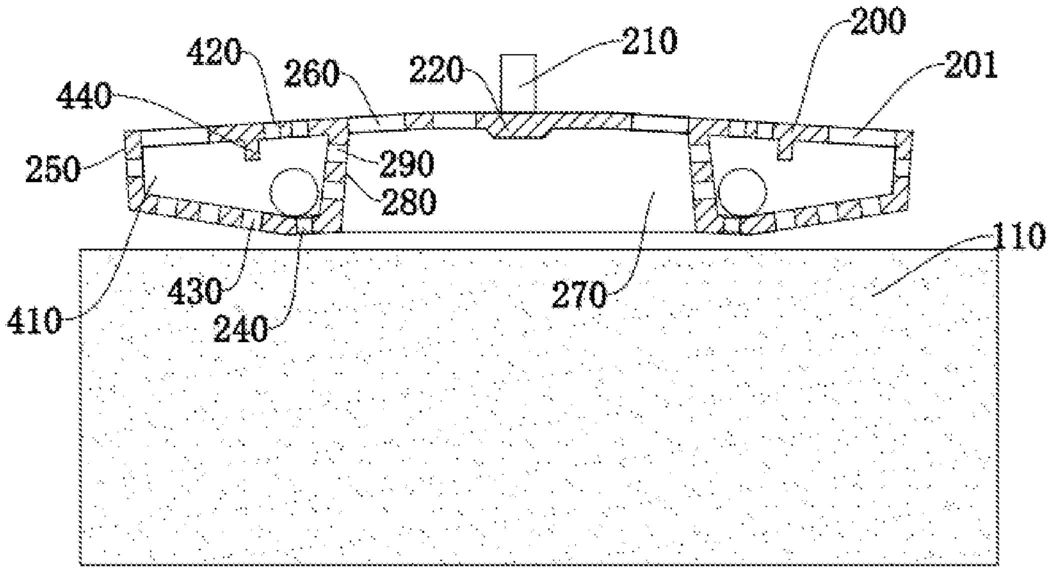
FIG. 17 is a sectional view of the stirring disc before being immersed in the molten metal in the seventh example embodiment of the disclosure.
Figure 18:
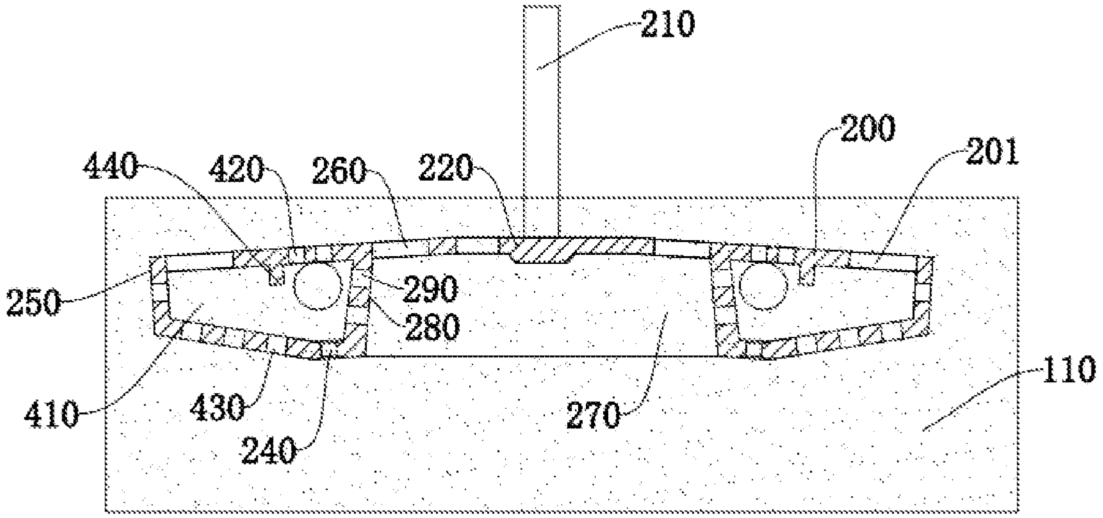
FIG. 18 is a sectional view of the stirring disc immersed in the molten metal in the seventh example embodiment of the disclosure.

Referring to FIG. 13, as a further technical solution, the baffle plate 440 tilts from top to down toward the direction of the feedstock inlet 201; the tilting design of the baffle plate 440 improves the feedstock baffling range of the lower end of the baffle plate 440, which may enhance the feedstock baffling performance of the lower end of the baffle plate 440 and thus may improve reliability.

The minimal interval between the lower end of the baffle plate 440 and the top wall of the cavity 410 is R1, the diameter of the feedstock is R2, R1<6/5R; with this design, the feedstock may be baffled by the baffle plate 440 after moving upward a small height.

Figure 19:
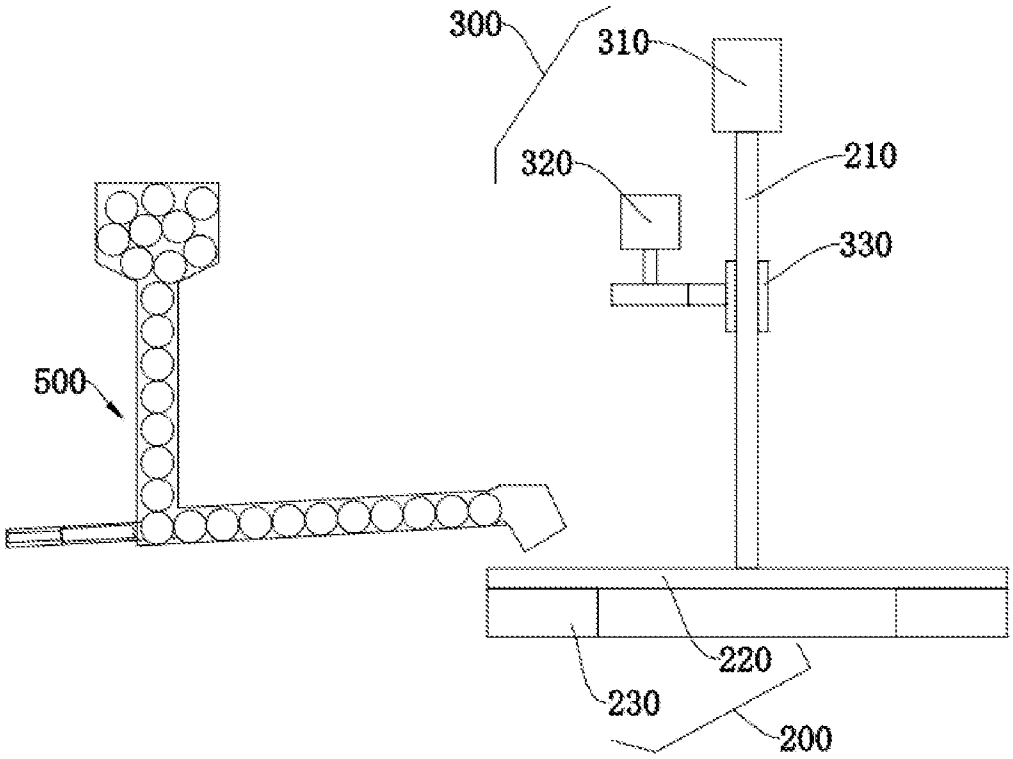
FIG. 19 is a structural schematic diagram of the automatic charger and the stirring device in the seventh example embodiment of the disclosure.

Referring to FIG. 19, based on the embodiments described supra, in one implementation of the disclosure, the drive device 300 comprises a lifting power element 310 and a rotating power element 320, a splined sleeve 330 fitting with the stirring rod 210 being sleeved over the stirring rod 210, the rotating power element 320 being configured to drive the splined sleeve 330 to rotate. Due to the splined-fitting between the stirring rod 210 and the splined sleeve 330, the splined sleeve 330 does not limit up-and-down movement of the stirring rod 210 relative to the splined sleeve 330. The lifting power element 310 is configurable to generate a power driving the stirring rod 210 to move up and down, allowing for the stirring disc 200 to be immersed in or lifted out of the molten metal or allowing for the stirring disc 200 to move up and down in the molten metal; the rotating power element 320 is configurable to drive the splined sleeve 330 to rotate, such that the splined sleeve 330 drives the stirring disc 200 to rotate in the molten metal, enhancing feedstock homogeneity in the molten metal.

Referring to FIGS. 12 through 18, based on the embodiments described supra, in one implementation of the disclosure, a plurality of feedstock holding portions 400 are provided on the stirring disc 200, the plurality of the feedstock holding portions 400 being arranged at intervals along a circumferential direction of the stirring disc 200. Provision of the plurality of feedstock holding portions 400 allows for more feedstock to be carried by the stirring disc 200, which eliminates a need of frequent replenishment of feedstock. By arranging the feedstock holding portions 400 at intervals along the circumference of the stirring disc 200, feedstock can be replenished to different parts of the molten metal, such that the feedstock is homogeneously melted in the molten metal without incurring intensive fluctuation or flow of the molten metal.

Referring to FIGS. 13 through 19, based on the embodiments described supra, in one implementation of the disclosure, the stirring disc 200 comprises a disc body 220 connected to the stirring rod 210 and an annular boss 230 disposed at the bottom of the disc body 220, the height of the upper surface of the disc body 220 being gradually reduced from the stirring rod 210 to the periphery. The upper surface of the disc body 220 serves to guide the molten metal such that when the stirring disc 200 moves upward, the molten metal in the direction of the stirring disc 200 may be guided by the upper surface of the disc body 220 to flow toward the periphery of the disc body 220, which can reduce the magnitude of stirring the molten copper, and during the process of the stirring disc 200 exiting the molten metal, the molten metal left on the upper surface of the stirring disc 200 may be reduced so as to prevent the cooled molten metal from blocking the openings.

A drainage port 240 through the lower surface of the stirring disc 200 is provided at the intersection between the bottom wall of the cavity 410 and the sidewall of the cavity 410 proximal to the second opening 430. During the process of the stirring disc 200 exiting the molten metal, a part of the molten metal in the cavity 410 may be drained via the second opening 430 at the bottom wall of the cavity 410, and the remaining part of the molten metal flows along the bottom wall of the cavity 410 toward the sidewall of the cavity 410, converges there, and is drained via the drainage port 240; this may reduce the amount of molten metal left on the stirring disc 200.

An outer-ring wall 250 of the annular boss 230 is connected to the periphery of the disc body 220. The openings further comprise a third opening 260, the third opening 260 being located at a position on the disc body 220 corresponding to a circular space 270 enclosed by the annular boss 230, the bottom end of the annular boss 230 being connected to its outer-ring wall 250 via a conical surface, the bottom end of the annular boss 230 being connected to the top wall of the circular space 270 also via a conical surface, such that the lower end of the annular boss 230 is shrunk from top to down, while the circular space 270 is gradually flared from top to down.

The annular boss 230 protrudes from the bottom of the disc body 220, such that during the process of immersing the stirring disc 200 in the molten metal, the annular boss 230 first accesses the molten metal prior to the disc body 220; since the lower end of the annular boss 230 is tapered, the annular boss 230, during the process of being immersed in the molten metal, generates a reduced intensity in stirring the molten metal, without incurring intensive fluctuation in the molten metal. The outer-ring wall 250 of the annular boss 230 is connected to the periphery of the disc body 220, such that the periphery of the disc body 220 does not protrude from the annular boss 230, which reduces the molten metal stirring magnitude at its peripheral portion during the process of immersing the disc body 220 in the molten metal, avoiding formation of a vortex around the stirring disc 200. When the annular boss 230 is completely immersed into the molten metal, the lower surface of the disc body 220 corresponding to the circular space 270 enclosed by the annular boss 230 contacts the molten metal, while provision of the third opening 260 allows for the molten metal to pass through the third opening 260, further reducing the molten metal stirring magnitude of the stirring disc 200. In addition, provision of the circular space 270 can also reduce the overall weight of the stirring disc 200, thereby reducing the load of the drive device 300. The sidewall of the circular space 270 serves to guide the molten metal, which can reduce the molten metal stirring magnitude of the lower surface of the disc body 220 corresponding to the circular space 270.

A radial opening 290 communicating with the cavity 410 is further provided on the inner-ring wall 280 and the outer-ring wall 250 of the annular boss 230 so as to facilitate circulation of the molten metal in the cavity 410.

Figure 12:
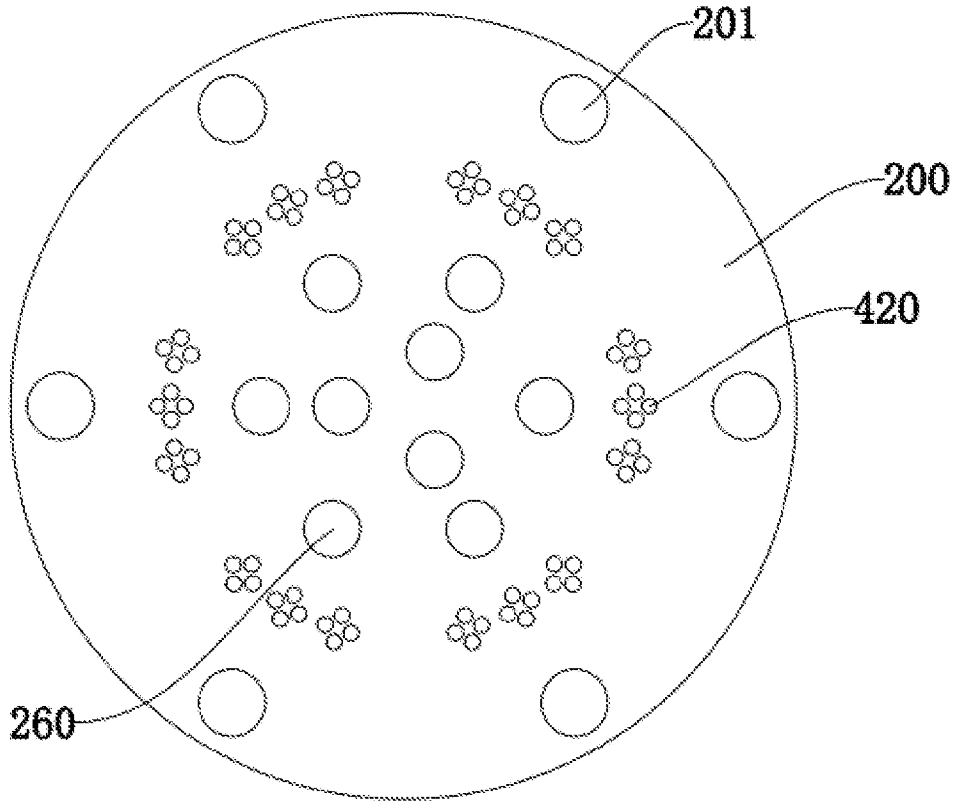
FIG. 12 is a top view of the stirring disc in the seventh example embodiment of the disclosure.

Referring to FIG. 12 through FIG. 18, based on the example embodiments described supra, in one implementation of the disclosure, a plurality of groups of third openings are provided on the top wall of the circular space 270, each group of the third openings comprising a plurality of third openings 260, the plurality of third openings 260 in each group of third openings being disposed along the circumferential direction of the stirring disc 200, as illustrated in FIG. 12. FIG. 12 illustrates two groups of third openings disposed on the stirring disc 200, one group thereof including three third openings 260, the other group thereof including six third openings 260. Among the plurality of groups of third openings, the height of the top wall of the circular space 270 around one group of the third openings is higher than the remaining portions of the top wall of the circular space 270, such that during the process of immersing the stirring disc 200 into the molten metal, the gas in the circular space 270 is discharged via that group of third openings, and also during the descending process of the stirring disc 200, the gas in the circular space 270 is discharged via the third openings 260.

Based on the example embodiments described supra, in one implementation thereof, the metal melting furnace including a stirring device further comprises an automatic charging apparatus 500 configured to replenish feedstock to the feedstock holding portion 400, where the automatic charging apparatus 500 may adopt any solution described in Example Embodiment 1 through Example Embodiment 6. The feedstock inlet 201 on the stirring disc 200 is aligned to the feeding inlet 101, such that the feedstock 800 charged by the automatic charging apparatus 500 into the feeding inlet 101 enters the feedstock inlet 201. The rotating power element 320 drives the stirring disc 200 to rotate intermittently to replenish the feedstock to each feedstock holding portion 400. The automatic charging apparatus 500 allows for automatic replenishment of the feedstock to the stirring disc 200, which eliminates manual charging, thereby enhancing operation safety as well as operation efficiency. Since a plurality of feedstock holding portions 400 are arranged on the stirring disc 200, during the feedstock replenishing process, the rotating power element 320 drives the stirring disc 200 to rotate to switch the feedstock holding portions 400 to be aligned to the automatic charging apparatus 500, whereby the feedstock is replenished to each feedstock holding portions 400 one by one. During the charging process, the stirring disc 200 rotates intermittently, providing sufficient time for charging; at this point, the stirring disc 200 and the automatic charging apparatus 500 are relatively still, avoiding offset when the feedstock drops off.

We claim:

1. An automatic charging apparatus for a furnace, comprising:

a hopper provided with an inlet opening and an outlet opening;

a buffer bin in which a buffer channel is provided, one end of the buffer channel being provided with a discharge port communicating with the outlet opening, another end of the buffer channel being in communication with a feeding inlet of a furnace; and a pushing mechanism configured to push feedstock in the buffer channel sequentially into the feeding inlet of the furnace, the pushing mechanism comprising a drive and a pushing element, the drive driving the pushing element to perform a reciprocating movement in the buffer channel such that the feedstock in the buffer channel is sequentially pushed into the feeding inlet via the reciprocating movement of the pushing element;

wherein a storage channel is inclinedly provided in the buffer bin, the storage channel being disposed above the buffer channel, an upper end of the storage channel being in communication with the outlet opening, a lower end of the storage channel being in communication with the buffer channel; and wherein a plurality of the storage channels are provided, the plurality of storage channels being successively arranged in a vertical direction; and in two neighboring storage channels, a lower end of an upper storage channel is in communication with an upper end of a lower storage channel.

2. The automatic charging apparatus for a furnace according to claim 1, wherein a cavity of the buffer bin is in communication with a cavity of the furnace; a plurality of through holes are provided in an inner wall of the buffer channel and/or an inner wall of the storage channel such that high-temperature gas in the furnace accesses the buffer channel and/or the storage channel in the buffer bin.

3. The automatic charging apparatus for a furnace according to claim 1, wherein a bottom surface of one end of the buffer channel proximal to the feeding inlet is provided with a limiting block, an inclined surface being provided on the limiting block, the inclined surface tilting from one side proximal to the feeding inlet toward one side distant from the feeding inlet such that the feedstock is pushed by the pushing element to move toward the feeding inlet along the inclined surface and cross over the limiting block into the feeding inlet.

4. The automatic charging apparatus for a furnace according to claim 3, wherein the pushing element is disposed below the discharge port, bottom surface of the buffer channel tilting from the side distant from the feeding inlet to the side proximal to the feeding inlet, a tilt angle of the bottom surface of the buffer channel being smaller than a tilt angle of the inclined surface such that when the pushing element is retracted, the feedstock in the buffer channel is retained in the buffer channel.

5. The automatic charging apparatus for a furnace according to claim 1, wherein the pushing element is disposed below the discharge port, the buffer channel comprising a forward tilting segment and backward tilting segment, the forward tilting segment being disposed at a side proximal to the pushing mechanism, the backward tilting segment being disposed at a side proximal to the feeding inlet, a bottom surface of the forward tilting segment tilting from a side distant from the feeding inlet to a side proximal to the feeding inlet, a bottom surface of the backward tilting segment tilting from a side proximal to the feeding inlet toward a side distant from the feeding inlet.

6. The automatic charging apparatus for a furnace according to claim 1, wherein the pushing element is disposed below the discharge port; a height of an upper end surface of the pushing element relative to bottom surface of the buffer channel is h1, and a height of the feedstock in the buffer channel relative to the bottom surface of the buffer channel is h2, $h2 \geq h1$, such that when the pushing element extends out, the feedstock above the buffer channel at least partially enters the buffer channel and contacts the upper end surface of the pushing element.

7. The automatic charging apparatus for a furnace according to claim 6, wherein $h2 \geq 2h1$.

8. The automatic charging apparatus for a furnace according to claim 1, wherein the pushing mechanism comprises a first drive, a second drive, a first pushing element, and a second pushing element, the first drive driving the first pushing element to perform a reciprocating movement in the buffer channel, the second drive driving the second pushing element to perform a reciprocating movement in the buffer channel, the first pushing element and the second pushing element being arranged in juxtaposition below the discharge port, a height of an upper end surface of the second pushing element relative to bottom surface of the buffer channel being h3, a height of the feedstock in the buffer channel relative to the bottom surface of the buffer channel being h2, $3h3 \leq h2 \leq 4h3$; when pushing the feedstock, the first pushing element and the second pushing element extend out simultaneously, such that after the feedstock in the buffer channel is completely pushed, the first pushing element is retracted first, such that the feedstock above the buffer channel at least partially enters the buffer channel and contacts the upper end surface of the second pushing element.

* * * * *